United States Patent
Gao et al.

(10) Patent No.: US 12,096,082 B2
(45) Date of Patent: *Sep. 17, 2024

(54) REINFORCEMENT LEARNING FOR DELIVERY OF CONTENT

(71) Applicant: HULU, LLC, Santa Monica, CA (US)

(72) Inventors: Pengfei Gao, Beijing (CN); Dingming Wu, Beijing (CN); Chunyang Wei, Beijing (CN); Xiaohui Xie, Beijing (CN); Shulei Ma, Beijing (CN)

(73) Assignee: HULU, LLC, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/062,299

(22) Filed: Dec. 6, 2022

(65) Prior Publication Data

US 2023/0096951 A1  Mar. 30, 2023

Related U.S. Application Data

(63) Continuation of application No. 17/315,107, filed on May 7, 2021, now Pat. No. 11,546,665.

(51) Int. Cl.
| | |
|---|---|
| *H04N 21/472* | (2011.01) |
| *G06N 5/04* | (2023.01) |
| *G06N 20/00* | (2019.01) |
| *G06Q 30/0207* | (2023.01) |
| *G06Q 30/0242* | (2023.01) |
| *G06Q 30/0251* | (2023.01) |
| *H04N 21/442* | (2011.01) |
| *H04N 21/45* | (2011.01) |
| *H04N 21/466* | (2011.01) |

(52) U.S. Cl.
CPC ............. *H04N 21/472* (2013.01); *G06N 5/04* (2013.01); *G06N 20/00* (2019.01); *G06Q 30/0212* (2013.01); *G06Q 30/0242* (2013.01); *G06Q 30/0255* (2013.01); *H04N 21/44222* (2013.01); *H04N 21/4532* (2013.01); *H04N 21/4662* (2013.01); *H04N 21/4667* (2013.01)

(58) Field of Classification Search
None
See application file for complete search history.

(56) References Cited

U.S. PATENT DOCUMENTS

| 11,546,665 B2 * | 1/2023 | Gao ................... G06Q 30/0212 |
| 2014/0282734 A1 | 9/2014 | Stern |

(Continued)

OTHER PUBLICATIONS

David Silver, "Lecture 2: Markov Decision Processes", downloaded www.davidsilver.uk/wp-content/uploads/2020/03/MDP.pdf May 7, 2021, 57 pages.

(Continued)

*Primary Examiner* — Jefferey F Harold
*Assistant Examiner* — Charles N Hicks
(74) *Attorney, Agent, or Firm* — Kwan & Olynick LLP

(57) ABSTRACT

In some embodiments, a method determines a reward metric based on feedback for an instance of content. A delivery status for a delivery constraint of the instance of content is applied to the reward metric to generate a constrained reward metric. The method uses the constrained reward metric to train a model. The model is used to select from a plurality of instances of content. One of the plurality of instances of content is selected for delivery using the model.

20 Claims, 7 Drawing Sheets

(56) References Cited

U.S. PATENT DOCUMENTS

| | | | |
|---|---|---|---|
| 2016/0112740 A1* | 4/2016 | Francisco | ........ H04N 21/25883 725/12 |
| 2017/0061528 A1 | 3/2017 | Arora et al. | |
| 2018/0308231 A1* | 10/2018 | Kish | .................... G06F 18/214 |
| 2021/0337277 A1 | 10/2021 | Scott-Green | |
| 2022/0058695 A1 | 2/2022 | Chud | |
| 2022/0360854 A1 | 11/2022 | Gao et al. | |

OTHER PUBLICATIONS

Mark Lee, "6.6 Actor-Critic Methods", Reinforcement Learning: An Introduction (book), Jan. 4, 2005, 3 pages.

Vijay Bharadwaj et al., "SHALE: An Efficient Algorithm for Allocation of Guaranteed Display Advertising", In KDD'12, pp. 1195-1203, Mar. 16, 2012.

Zhen Fang, et al. "Large-Scale Personalized Delivery for Guaranteed Display Advertising with Real-Time Pacing." 2019 IEEE International Conference on Data Mining (ICDM). IEEE, Nov. 2019, 11 pages.

* cited by examiner

REINFORCEMENT LEARNING FOR DELIVERY OF CONTENT

CROSS REFERENCE TO RELATED APPLICATIONS

This application is a continuation application and, pursuant to 35 U.S.C. § 120, is entitled to and claims the benefit of earlier filed application U.S. application Ser. No. 17/315,107 filed May 7, 2021, entitled "REINFORCEMENT LEARNING FOR GUARANTEED DELIVERY OF SUPPLEMENTAL CONTENT", the content of which is incorporated herein by reference in its entirety for all purposes.

BACKGROUND

In a guaranteed delivery environment, a main content provider may enter into contracts with individual supplemental content providers that guarantee to show their supplemental content a pre-specified number of times to user accounts that match targeting constraints. For example, a supplemental content provider may wish to target adults between the ages of 21 to 35 and require the supplemental content to be displayed 50 million times to this group. In guaranteed contracts, the main content provider takes on the risk of uncertainty in supply to display the supplemental content and guarantees that the supplemental content will be displayed 50 million times to user accounts that match the targeting constraints. The main content provider may face penalties for under-delivering the supplemental content. To avoid penalties, the main content provider may attempt to deliver on the supplemental content as much as possible to meet the delivery goal.

The main content provider may have large numbers of contracts that compete for overlapping requirements and may attempt to allocate the impressions to satisfy all constraints. However, the allocation may not optimally allocate instances of supplemental content to user accounts because the main content provider may consider under delivery as a metric to measure the delivery performance. For example, a user account may include characteristics that may be targeted by many supplemental content providers and a list of instances of supplemental content compete for the opportunity. The main content provider may have to allocate which instance of supplemental content is displayed for the opportunity. Typically, the main content provider may select the instance of supplemental content based on short-term impact, such as the delivery goal. Prior methods failed to handle user heterogeneity within crowds and optimization of long-term rewards in guaranteed delivery environments.

BRIEF DESCRIPTION OF THE DRAWINGS

With respect to the discussion to follow and to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Described herein are techniques for a video delivery system. In the following description, for purposes of explanation, numerous examples and specific details are set forth to provide a thorough understanding of some embodiments. Some embodiments as defined by the claims may include some or all the features in these examples alone or in combination with other features described below and may further include modifications and equivalents of the features and concepts described herein.

A system allocates instances of supplemental content based on delivery contracts. The delivery contracts include delivery constraints that may specify characteristics for user accounts and delivery requirements, such as the number of instances included in a guaranteed delivery contract and pacing requirements. Different instances of supplemental content may include different delivery constraints that may or may not overlap with other delivery constraints for other instances of supplemental content.

The system may allocate instances of supplemental content to display to a user account using short-term reward metrics and long-term reward metrics. The short-term reward metrics may be based on short-term feedback, such as feedback that is based on the instance of supplemental content being displayed. Examples of short-term reward metrics include click through rate (CTR) or conversion rate (CVR) for the instance of supplemental content. The feedback may be based on an interaction with the instance of supplemental content. Long-term reward metrics may be modeled based on long-term feedback that may be measured after the instance of supplemental content is delivered and/or after multiple instances of supplemental content are delivered. Examples of long-term reward metrics include user account watch hours (e.g., dwell time) and user retention for the video delivery service. The long-term reward metrics may not involve interaction with at least one instance of supplemental content in a time period. The system may optimize the delivery of instances of supplemental content based on both the short-term reward metrics and the long-term reward metrics. This may deliver instances of supplemental content that are relevant to the user account and also influence the overall viewing experience positively compared to just considering short-term reward metrics. For example, the system may deliver relevant instances of supplemental content to user accounts while also maximizing the long-term reward metrics for the main content provider, such as user watch minutes in the video delivery system.

System Overview

Figure 1:
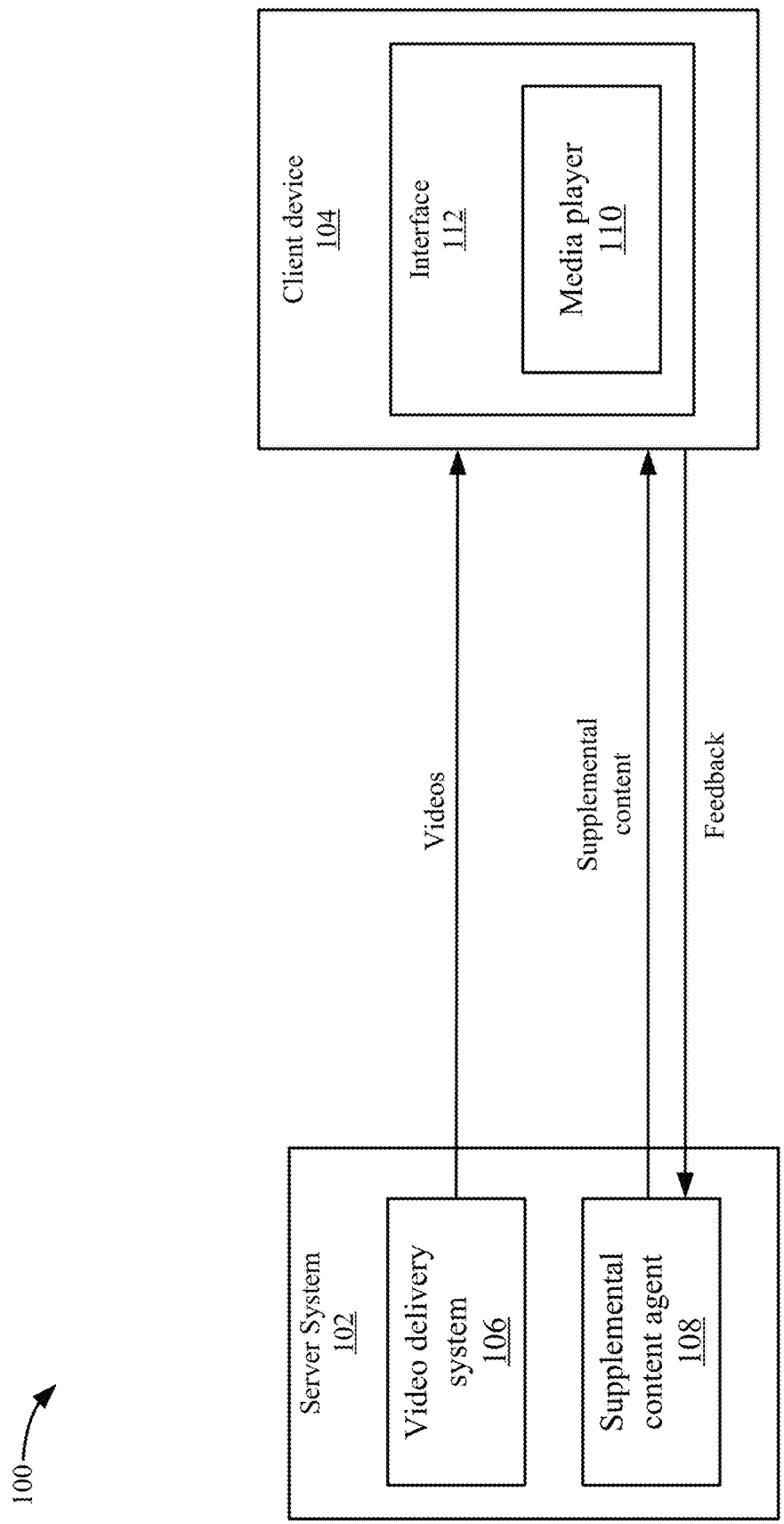
FIG. 1 depicts a simplified system for delivering supplemental content according to some embodiments.

FIG. 1 depicts a simplified system 100 for delivering supplemental content according to some embodiments. System 100 includes a server system 102 and a client device 104. Although a single instance of server system 102 and client device 104 is shown, multiples instances will be appreciated. For instance, server system 102 may include multiple servers or other computing devices to provide the functionality described herein. Also, system 100 may include multiple client devices 104 that interact with server system 102.

Server system 102 may include a video delivery system 106 that delivers videos to client devices 104. In some embodiments, video delivery system 106 may use a content delivery network (CDN) (not shown) to deliver the videos. The videos may be associated with main content, which is content that is requested by a user account associated with client device 104. For example, a user account may request a movie, an episode of a show, etc. Although videos are described, it will be understood that other content may also be delivered as the main content, such as a website, page of content, etc.

Client device 104 may be a computing device, such as a smartphone, living room device, personal computer, tablet, television, set-top box, etc. Client device 104 may include an interface 112 that may display the main content, such as videos. For example, a media player 110 may play back a video that is requested from video delivery system 106. A user account may use client device 104 and may be associated with video delivery system 106 (e.g., the user account signs up for the service). Also, video delivery system 106 may store characteristics for the user account, such as an age of a user, watch history, etc.

At some point, such as during a break in the video or when a page is displayed, a supplemental content agent 108 may select instances of supplemental content to deliver to client device 104. An instance of supplemental content may be different from the main content, such as the supplemental content may not have been originally requested by client device 104 as compared to the request for the main content. An example of supplemental content may be an advertisement that is displayed during a break in the main content. Supplemental content agent 108 may detect when supplemental content should be displayed. For example, during the main content, a break may occur in which one or more instances of supplemental content should be displayed. In other embodiments, supplemental content may be displayed on a site, such as a web page, simultaneously with the main content that a user account is viewing. It will be understood that supplemental content may be displayed in different scenarios.

In some embodiments, supplemental content agent 108 may communicate with other devices or modules to determine the supplemental content to display. For example, supplemental content agent 108 may receive a list of instances of supplemental content that are eligible to be displayed during a break. The list may be based on different factors, such as delivery constraints that match the characteristics of the user account or the any instances that are available for that break. When the supplemental content is selected, server system 102 sends the supplemental content to client device 104. Client device 104 may then display the supplemental content. The display of the supplemental content may form an impression, which is when supplemental content is displayed to the user account.

Some feedback for the supplemental content may be received, such as the user account may select the supplemental content, the user account may stop watching the video, the user account may pause the video to view the supplemental content, the user account may skip past (e.g., fast forward) the supplemental content, the user account may log-off the video delivery system service, etc. Supplemental content agent 108 may use the feedback to generate short-term reward metrics and long-term reward metrics.

As will be described in more detail below, supplemental content agent 108 selects the supplemental content based on short-term reward metrics and long-term reward metrics. The short-term reward metrics may be an immediate reward for system 100. In some embodiments, the immediate reward may be based on feedback (e.g., an interaction) with the display of the instance of supplemental content. Different methods may be used to measure the short-term reward metrics. For example, the short-term reward metric may be based on feedback that is received while the instance of supplemental content is displayed. That is, the short-term reward metric may end when the instance of supplemental content stops being displayed at client device 104. Also, the short-term reward metric may be measured using other methods, such as any feedback from a first time when the instance of supplemental content is displayed to before a second time when another instance of supplemental content is displayed.

The long-term reward metric may be a reward that may be measured after the delivery and display of at least one instance of supplemental content. For example, the long-term reward metric may be measured based on the delivery of multiple instances of supplemental content. Examples of long-term reward metrics may be the user account's long-term engagement with video delivery system 106, user account retention, and user account watch minutes. The long-term engagement may be characteristics of the engagement of the user account on video delivery system 106 after the display of the instance of supplemental content, the user retention may be if the user stops viewing the main content and may unsubscribe from the service, and watch minutes may be how many minutes the user account views after the display of the instance of supplemental content.

In a guaranteed delivery setting, video delivery system 106 may have a guaranteed contract with a supplemental content provider that specifies a delivery goal and targeting characteristics. Supplemental content agent 108 may allocate instances of supplemental content to possible impressions that meet the targeting characteristics to ensure the total delivery goal for each contract may be satisfied. Video delivery system 106 may also have pacing targets that ensure ad delivery in each time interval may be delivered as evenly as possible. That is, video delivery system 106 may not want to deliver 500 impressions in the first minute when the desired delivery of the contract should last multiple days. Meanwhile, the instance of supplemental content shown to user accounts may affect the short-term reward metrics and the long-term reward metrics. For example, the selected instance of supplemental content may or may not be relevant to the interest of the user account. Also, the selected instance of supplemental content may affect long-term revenue of video delivery system 106 because it is more favorable to have user accounts watch more minutes of videos. Accordingly, delivering irrelevant instances of supplemental content may impact the short-term user viewing experience thus causing user accounts to not interact with the instance of supplemental content. The longer term user experience may also affect the revenue of video delivery system 106 by causing the user account to stop using the service or leave (e.g., unsubscribe from) the service entirely. Supplemental content agent 108 selects instances of supplemental content that may ensure the delivery goal of each instance of supplemental content, ensure even pacing, and also improve the short-term reward metrics and the long-term reward metrics.

In guaranteed delivery, supplemental content agent 108 may have a large number of impressions together with a number of delivery contracts for instances of supplemental content. These contracts specify a demand as well as a target and supplemental content agent 108 should deliver a number of impressions at least as large as the specified demand, and further, each impression should match the target specified by the contract. Supplemental content agent 108 may model the contracts as a process, such as using a bipartite graph. On one side are supply nodes, representing impressions, where each impression is associated with a display of an instance of supplemental content. On the other side are demand nodes, which represent contracts for instances of supplemental content. Supplemental content agent 108 connects a given supply node to a given demand node if and only if the impression that the supply node represents is eligible (e.g., matches the delivery constraints) for the contract represented by the demand node. In general, supply nodes may represent several impressions each, and thus each supply node is labeled with a weight $s_i$, leading to a weighted graph. In real-world applications, the number of supply nodes is large due to the diversity in user attributes, but the number of contracts for instances of supplemental content is usually small compared to the number of supply nodes. An optimal allocation should both be feasible and minimize some objective function. Here, supplemental content agent 108 balances two goals of minimizing the under delivery penalty (e.g., not achieving the guaranteed delivery goal), and maximizing long-term reward metrics. For example, supplemental content agent 108 may use a novel reinforcement method to select instances of supplemental content. Within the process, supplemental content agent 108 may use a reward that is modeled on short-term reward metrics and long-term reward metrics. Also, the long-term reward may be a constrained reward that models a long-term reward with delivery constraints that may be associated with the pacing of delivery, such as an under delivery or over delivery of the instance of supplemental content. The under delivery or over delivery may be determined based on a current delivery status of the instance of supplemental content compared to a delivery constraint (e.g., the guaranteed delivery goal), which results in an unsatisfied delivery constraint. Supplemental content agent 108 uses the reward to adjust the selection of instances of supplemental content. The selection of instances of supplemental content improves the operation of server system 102 by selecting more relevant instances of supplemental content.

Supplemental Content Delivery Process

Figure 2:
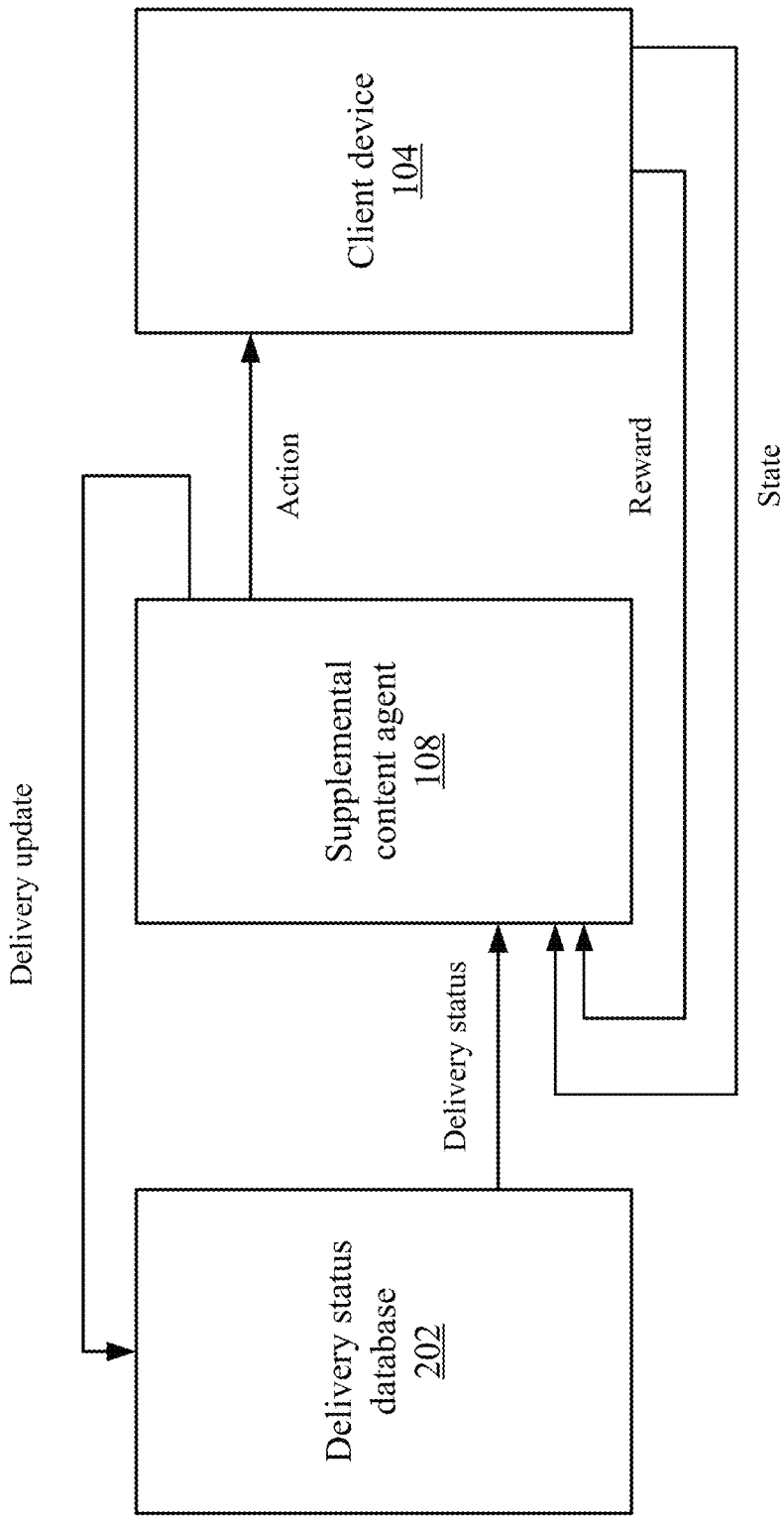
FIG. 2 depicts an example of a process to select instances of supplemental content according to some embodiments.

Supplemental content agent 108 may implement a constrained reinforcement learning process for supplemental content allocation, such as in guaranteed delivery of supplemental content. Although guaranteed delivery is discussed, the process may be used in other types of delivery contracts, such as non-guaranteed delivery. FIG. 2 depicts an example of a process to select instances of supplemental content according to some embodiments. The process may be defined using elements of a state space S, an action space A, a probability P, a reward R, and a discount factor $\gamma$, (S, A, P, R, $\gamma$).

When it is time to deliver an instance of supplemental content, such as during a break in a video or when a website is displayed, supplemental content agent 108 may receive state information based on the user account that is using client device 104. A state may be $s_t \in S$, where the state is a member of a set of features that may include a user account's recommendation and supplemental content browsing history before time t and the contextual information for the user account in the current impression at time t. The contextual information may describe the user account and also the features for the supplemental content to target. For example, user account features may include an age, gender, a watch history, an ad interaction history, and other information from a user account. The user account session features may include a supplemental content sequence watched by the user account in the current user watch session. Supplemental content features may include a supplemental content brand name, creative video embedding, genre, industry name, and other information. Supplemental content agent 108 may process the features and store the features as a list of real numbers that rate the features. The delivery status, such as demand, supply, delivery percentage may also be part of the state. The delivery status may be based on the delivery of instances of supplemental content. For example, the delivery status may include the start date and the end date of the delivery of the instance of supplemental content, a total delivery goal, a goal in the next T minutes (e.g., T is a hyperparameter, which may be a defined parameter), delivery of instances in the past T minutes, delivery counts since the start date, how many impressions an instance of supplemental content has achieved, the pacing for the impressions, the supply of possible impressions from user accounts, the demand for impressions from delivery contracts, and other information that may describe the delivery and pacing status of an instance of supplemental content. In some embodiments, the above information is processed and stored as a list of real numbers that rate the delivery status. For example, a delivery status database 202 may provide the delivery status to supplemental content agent 108.

A probability $P(s_t+1|s_t, a_t)$ is a state transition probability from a state $s_t$ to $s_t+1$ after executing action $a_t$. The process satisfies the property $P(s_t+1|s_t, a_t, \ldots, s_1, a_1) = P(s_t+1|s_t, a_t)$. Supplemental content agent 108 tries to select actions so that the sum of the rewards it receives over the future is maximized using the probability.

The discount factor $\gamma \in [0, 1]$ defines the expected discounted returns. The model may also use a discount factor, such as a hyperparameter, to determine the impact of user feedback through time. The discount factor may determine how much supplemental content agent 108 cares about rewards in the distant future relative to the immediate future.

Supplemental content agent 108 attempts to find a policy to generate an action $a_t$ at each time step t for J delivery contracts running that are available and simultaneously optimizing features, such as the user account experience and the revenue for video delivery system 106. As will be discussed in more detail below, supplemental content agent 108 considers the delivery constraints and produces actions that maximize long-term rewards. The long-term reward may be implemented with a constrained reward R. Supplemental content agent 108 models the process as a constraint control problem. The delivery goal is expressed as a constraint, and the objective is to improve long-term reward metrics while guaranteeing delivery goals based on a current delivery status. The constrained reward takes delivery goal into consideration as a delivery constraint.

Supplemental content agent 108 may generate an action. In some embodiments, the action may be used to select an instance of supplemental content, which is sent to and results in an impression to the user account that is using client device 104. Supplemental content agent 108 may also provide the selection to delivery status database 202 to update the delivery status for the instance of supplemental content. In some embodiments, the action may be an allocation plan that is used to select an instance of supplemental content. The allocation plan will be discussed in more detail below, but may be used to rate instances of supplemental content. The allocation plan may maximize the long-term reward metrics while also satisfying the delivery constraints.

Once the instance of supplemental content is delivered, client device 104 may provide feedback for the reward to supplemental content agent 108. The feedback may be used to determine short-term reward metrics, such as a click-through rate of the instance of supplemental content that is delivered to client device 104. Also, the feedback may be used to determine long-term reward metrics, which may measure watch minutes of the user account after a period of time has elapsed after an instance of supplemental content is displayed. The measurement may be for X instances of supplemental content that have been delivered over a time period.

Supplemental content agent 108 may use a reward that represents the short-term reward, long-term reward, and delivery constraints at the same time. Long-term rewards $R_l$ are the cumulative reward supplemental content agent 108 receives over a time period that exceeds the delivery of one instance of supplemental content. Formally, the long-term reward $R_l$ can be represented by expected cumulative long-term returns of the delivery of instances of supplemental content. Alternatively, short-term rewards $R_s$ may be defined by the immediate returns of the delivery of instances of supplemental content. For example, in delivery system, click through feedback is a short-term reward, since user accounts initiate the click behavior based on the current context and instance of supplemental content. However, the user account watch minutes (e.g., dwell time) is a long-term reward, since the user account may decide to leave the main content provider's site after browsing a series of recommended instances of supplemental content. Therefore, the watch minutes may be affected by a series of delivered instances of supplemental content. The rewards will be described in more detail below.

Figure 3:
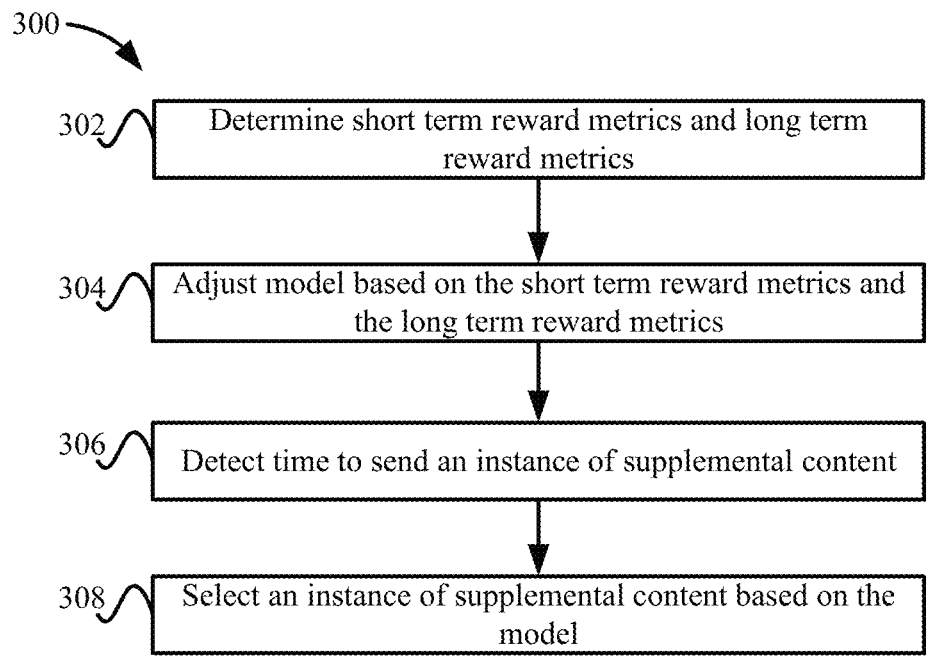
FIG. 3 depicts a simplified flowchart for selecting supplemental content according to some embodiments.

FIG. 3 depicts a simplified flowchart 300 for selecting supplemental content according to some embodiments. At 302, supplemental content agent 108 determines short-term reward metrics and long-term reward metrics. At 304, supplemental content agent 108 adjusts a model based on the short-term reward metrics and the long-term reward metrics. The adjusting of the model may train the model to reflect changes in short-term reward metrics and long-term reward metrics. The process of training the model will be described in more detail below.

At 306, supplemental content agent 108 detects a time to send an instance of supplemental content. As discussed above, the time may be upon the download of a website, during a break in a video, or upon any other request for supplemental content. At 308, supplemental content agent 108 selects an instance of supplemental content based on the model. The following will now describe the selection of the instance of supplemental content based on the model.

Supplemental Content Agent

Figure 4:
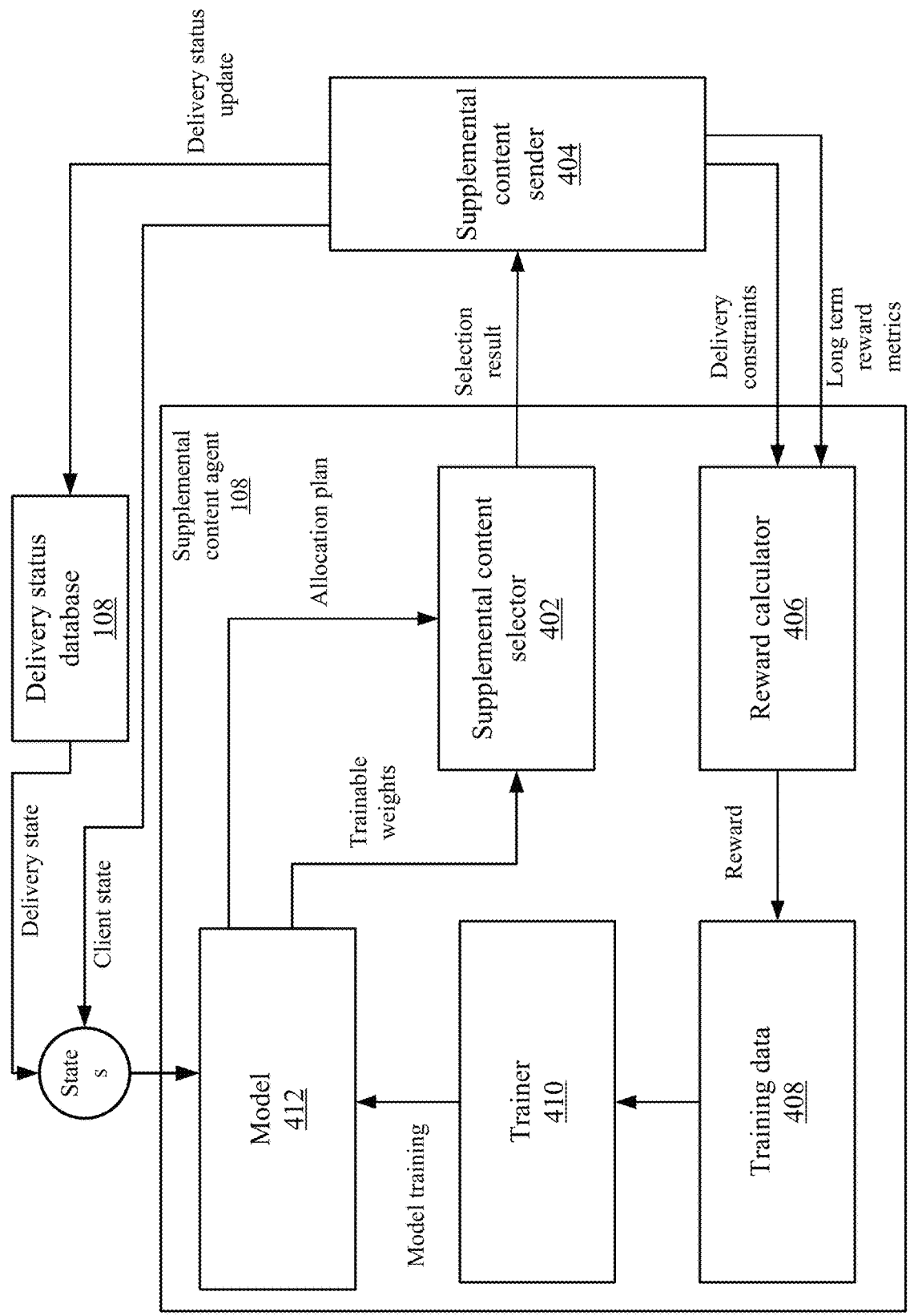
FIG. 4 depicts a more detailed example of a supplemental content agent according to some embodiments.

FIG. 4 depicts a more detailed example of supplemental content agent 108 according to some embodiments. A reinforcement learning problem may include an actor and a critic. The actor may be implemented by a model 412 and takes a state s as input and outputs an action. In some embodiments, the model may be a deep neural network (DNN), but other types of prediction networks may be used. For example, any trainable function that maps a state into an action and a value may be used. A supplemental content sender 404 may receive client state, such as contextual data, from client devices 104. The contextual data may be information regarding the user account. Supplemental content sender 404 may then provide the client state to model 412. Additionally, supplemental content sender 404 may provide delivery status updates, such as pacing constraints, to model 412. Supplemental content agent 108 may model a state s definition using contextual data from a user account associated with client device 104 and delivery state from the delivery of the instances of supplemental content from delivery status database 108.

The action may be an allocation plan, which may allocate a value to each instance of supplemental content. For example, there may be M qualified instances of supplemental content for an impression. The qualified instances may be received from a device that serves the supplemental content, such as an ad server. The allocation plan may assign a value to each instance of supplemental content, such as the allocation plan may be a list of real numbers with the same size as the number of instances of supplemental content that are eligible to be sent. That is, if there are 100 instances of supplemental content that could be provided for an impression, the allocation plan may have 100 numbers. The allocation plan can be represented by $[\alpha_1, \alpha_2, \ldots, \alpha_N]$, where N is the size of ads running in the system. $\alpha_i$ represents the average selection weight of an instance of supplemental content i.

Model 412 uses the allocation plan to calculate relevance weights $\{w_j\}$ for the instances of supplemental content. For example, model 412 may determine a relevance weight for each instance of supplemental content. For example, an instance that is weighted with a higher probability may have a higher relevancy to the request. The relevancy may be determined based on a relevancy of an instance of supplemental content to the current state associated with the request. Model 412 may use different methods to generate the relevancy weights. For example, model 412 outputs a vector of real numbers V. The user features in real-time can be represented by a real number vector U. The relevance score can be calculated from a dot product between the vector U and the vector V of Relevance Score=U*V. Also, model 412 can directly output a relevance score for user and instance of supplemental content. Thus, when the allocation plan indicates an instance of supplemental content is rated higher (e.g., compared to other instances), model 412 may adjust the respective weight, such as by increasing the weight. Conversely, when the allocation plan indicates an instance of supplemental content is rated lower, model 412 may adjust the respective allocation weight, such as by decreasing the allocation weight. Thus, the weights may be selection probabilities for instances of supplemental content. The allocation plan is used for adjusting the supplemental content selection rate globally, and the trainable selection weights are used as parameters for estimating optimal selection weights for eligible instances of supplemental content. That is, the allocation plan may be a global plan to allocate instances of supplemental content over time while the selection weights are for selection of an instance of supplemental content for a current impression.

Supplemental content selector 402 may generate selection weights $[q_1, q_2, q_3, \ldots, q_L]$ from the allocation plan and the relevance weights. For example, supplemental content selector 402 uses a function that maps the allocation plan, relevance weights, and the current state to selection weights for each qualified ad. For example, the function $f([\alpha_1, \alpha_2, \alpha_3, \ldots, \alpha_N], state|\{w_j\})$ can be a linear function, such as:

$$f([\alpha_2, \alpha_3, \ldots, \alpha_N], state|\{w_j\}) = [q_1, q_2, q_3, \ldots, q_L],$$

where L is eligible supplemental content list size, and q is the selection weights of each qualified instance of supplemental content. In other words, supplemental content selector 402 may adjust the relevance weights based on the current state by considering long-term and short-term rewards for respective instances of supplemental content. The selection weights are used to select an instance of supplemental content. To select the instance of supplemental content, an instance of supplemental content that is weighted with a higher probability may have a higher chance of being selected (e.g., when weighted random selection is used) compared to an instance that is weighted with a lower probability. Supplemental content selector 402 uses the values of the allocation plan to generate the selection weights from the relevance weights. The process may be an integration (e.g., normalization) of the allocation plan into the relevance weights to generate the selection weights. For example, when the allocation plan indicates an instance of supplemental content is rated higher (e.g., compared to other instances), supplemental content selector 402 may adjust the respective relevance weight, such as by increasing the weight. Conversely, when the allocation plan indicates an instance of supplemental content is rated lower, supplemental content selector 402 may adjust the respective relevance weight, such as by decreasing the weight. Thus, the selection weights may be selection probabilities for instances of supplemental content. The allocation plan is used for adjusting the supplemental content selection rate globally, and the selection weights are used as parameters for estimating optimal selection weights for eligible instances of supplemental content. That is, the allocation plan may be a global plan to allocate instances of supplemental content over time while the selection weights are for selection of an instance of supplemental content for a current impression.

Supplemental content selector 402 may select the instance of supplemental content differently based on different conditions. For example, when there is under pacing risk, such as if the sum of selection weights is less than or equal to a value, such as 1, (e.g., $\Sigma q_k \leq 1$), this means there are enough inventory for the possible impressions, then the selection probability of each instance of supplemental content in the qualification list is $q_k$. If the sum of weights is greater than the value, (e.g., $\Sigma q_k \leq 1$), this means there is an under pacing risk, and supplemental content selector 402 may order the qualified instances by priority using the selection weights and select higher priority instances first. The selection probability is the weighted average of $q_k$ with a set of high priority instances of supplemental content with weights that are less than 1, $\Sigma q_k \leq 1$, may be selected first. Accordingly, the higher the weight may indicate the need to deliver instances of that supplemental content due to an under pacing risk. Supplemental content selector 402 can select supplemental content from the qualified supplemental content list randomly with a selection probability proportional to selection weights $[q_1, q_2, q_3, \ldots, q_L]$.

Then, supplemental content selector 402 may randomly select an instance of supplemental content based on the values of $q_k$. The randomness allows supplemental content selector 402 to consider all instances of supplemental content, but higher weighted instances may have a higher chance of being selected. Other methods may also be used to select the instance of supplemental content, such as selecting the highest ranked instance of supplemental content.

The output action of model 412 limits the output action space and allows faster convergence for training compared to directly outputting selection probability of each instance-inventory pair. For example, model 412 only needs to provide the allocation plan for each instance of supplemental content, which is may a real number for each instance of supplemental content. On the contrary, if model 412 outputs the selection probability, model 412 needs to output a real number (e.g., the selection probability) for every possible combination of user account and instance of supplemental content. However, although this method of selecting an instance of supplemental content is described, other methods may be used. For example, model 412 may output the selection probability for each instance of supplemental content. Also, supplemental content selector 402 may use the allocation plan differently to select the instance of supplemental content.

A supplemental content sender 404 may provide instances of supplemental content to client devices 104. Then, after receiving feedback from client devices 104, supplemental content sender 404 may send long-term reward metrics and delivery constraints/delivery status to a critic to generate a constrained reward. The critic may train model 412 using feedback that may use long term reward metrics and short term reward metrics. As will be discussed below, a constrained reward may be used to train model 412, which may represent the long-term reward with the delivery status for the delivery constraints of supplemental content delivery contracts.

Reward Calculation

Once the instance of supplemental content is delivered, supplemental content agent 108 may receive feedback, such as for short-term reward metrics and long-term reward metrics. The reward may measure the value gained for the main content provider after sending an instance of supplemental content for an impression. The reward may be defined using different metrics that can be represented as a number. For example, a large reward value represents the impression as a high value and a low value represents the impression has a low value.

A reward calculator 406 may model the long-term rewards $R^l$ and short-term reward $R^s$ by a general reward $R^g$, where $R^g = R^l + R^s$. Since the short-term reward can be represented by an additional term added to the long-term reward, without loss of generality, supplemental content agent 108 may consider the long-term rewards $R^l$ with an additional term that represents the short-term rewards. For example, to combine the short-term reward and long-term reward, reward calculator 406 may use a weighted sum:

$$R = w_0 * + w_1 * R^s$$

where $w_0$ and $w_1$ are hyper-parameters. The general reward is then constrained by unsatisfied delivery constraints. For example, a generalized reward $R_t$ at time step t may include two parts: long-term reward $R_t^l$ and the constrained reward $R_t^c$.

The long-term reward $R_t^l$ may represent user account feedback after an instance of supplemental content is displayed at the state $s_t$ in a time window $T_q$. For example, the long-term reward may be the total watch time of the user account watch session, where the watch session may be a collection of events that starts when the user account starts watching a video and ends when the user account stops watching the video. If the user account stops watching the video before the end of the video, supplemental content agent 108 assigns a smaller reward; otherwise, the impression will receive a larger reward with the longer the watch minutes translating into a higher reward.

The constrained reward $R_t^c$ is a novel reward design that reflects the long-term reward with a constraint that is based on the cost of unsatisfied delivery constraints (e.g., the under delivery or over delivery that is based on the delivery status compared to the delivery constraint). The unsatisfied delivery constraints may be modeled as a penalty term and it is dynamic during training. The value of the constrained reward $R_t^c$ may decrease the general reward $R_t$ when the allocation plan does not satisfy the delivery constraint. That is, when the delivery status of an instance of supplemental content is far from its delivery goal, the constrained reward may be penalized based on the value of the delivery constraints. The constrained reward may be calculated as:

$$R_t^c = R_t - R_t^l,$$

where $R_t$ is the general reward and $R_t^l$ is the long-term reward at a time t. The constrained reward is based on the equation of the final reward $R^r$ being equal to the sum of rewards $R_t^l$ and $R_t^c$. In some embodiments, the constrained reward may be:

$$R_t^c = \sum_{j \in \Gamma(i)} -\lambda_p c_j(s_t, a_t) = \lambda_p \sum_{j \in \Gamma(i)} \left( x_{ij} - \frac{d_j}{|\Gamma(j)|} \right)$$

$$R_t^c = \sum_{j \in \Gamma(i)} -\lambda_p c_j(s_t, a_t) = \lambda_p \sum_{j \in \Gamma(i)} \left( x_{ij} - \frac{d_j}{|\Gamma(j)|} \right)$$

where $c_j(i) = c_j(s_t, a_t)$ is the delivery constraint at each time step, the state $s_t$ and the action $a_t$ are the state and action at the time t. The variable $d_j$ is the total delivery goal of the supplemental content j, $\Gamma(j)$ is the estimated total qualification count of the instance of supplemental content j, and $x_{ij}$ is the selection probability of the instance of supplemental j at a time i. A large value of Pi means the instance of supplemental content j has under pacing risk. The parameter $\lambda_p$ is based on the delivery status of an instance of supplemental content. For example, parameter $\lambda_p$ is a learnable parameter that may increase when the under delivery of the instance of supplemental content is large, and decrease or be lower when under delivery is small or there is over delivery per pacing requirements. Accordingly, the constrained reward may be based on the long term reward, but is constrained by the delivery status of the instance of supplemental content. Other versions may be used to calculate the constrained reward, such as using a weighted expectation of how much the constraints are violated for a delivery of an instance of supplemental content. For example, a weight may increase when there is an under pacing risk, and decrease when there is less of an under pacing risk.

Reward calculator 406 stores the final reward in training data 408 for delivery of the instance of supplemental content. As different feedback is received at different times, reward calculator 406 updates training data 408. Reward calculator 406 may perform both on-policy training and off-policy training. On-policy training may be performed after each reward that is received. That is, model 412 may be adapted while outputting the allocation plans. Off-policy training may be performed after running supplemental content agent 108 for T minutes, where T is a hyperparameter. The hyperparameter may be a defined parameter whose value is used to control the learning process. In contrast, the values of other parameters may be derived via the training process. Then, supplemental content agent 108 uses the collected action-reward pairs from past versions of model 412 as training data. Different implementations can be used to perform the on-policy and off-policy training methods. For example, supplemental content agent 108 can use the actor-critic reinforcement learning model structure to train the actor, such as trainer 410 uses policy gradients to fit a policy $\pi(a|s)$. For example, after collecting enough batches of training data, trainer 410 can compute the training errors based on the training data 408, then update model 412 based on the training error. The training error for the critic may be temporal difference (TD) error. For example, the TD error may define $r_t$ as the long-term reward received at each step of the action, $\gamma$ as the discount factor that is used to weight the most recent rewards more, $V(\ )$ as the state value function used by model 412:

$$TD_t = r_{t+1} + \gamma \cdot V(s_{t+1}) - V(s_t).$$

Trainer 410 may use a TD learning policy gradient may be used to train model 414. Trainer 410 may attempt to maximize the accumulated reward. For example, the critic learns the state value function $V(s)$, which represents the expected long-term reward the system can achieve given state s, and can adjust model 412 based on the training error, which may be proportional to TD error:

$$\text{Err}_{actor} = \beta \cdot TD_t.$$

Long-Term Reward Metric

Figure 5:
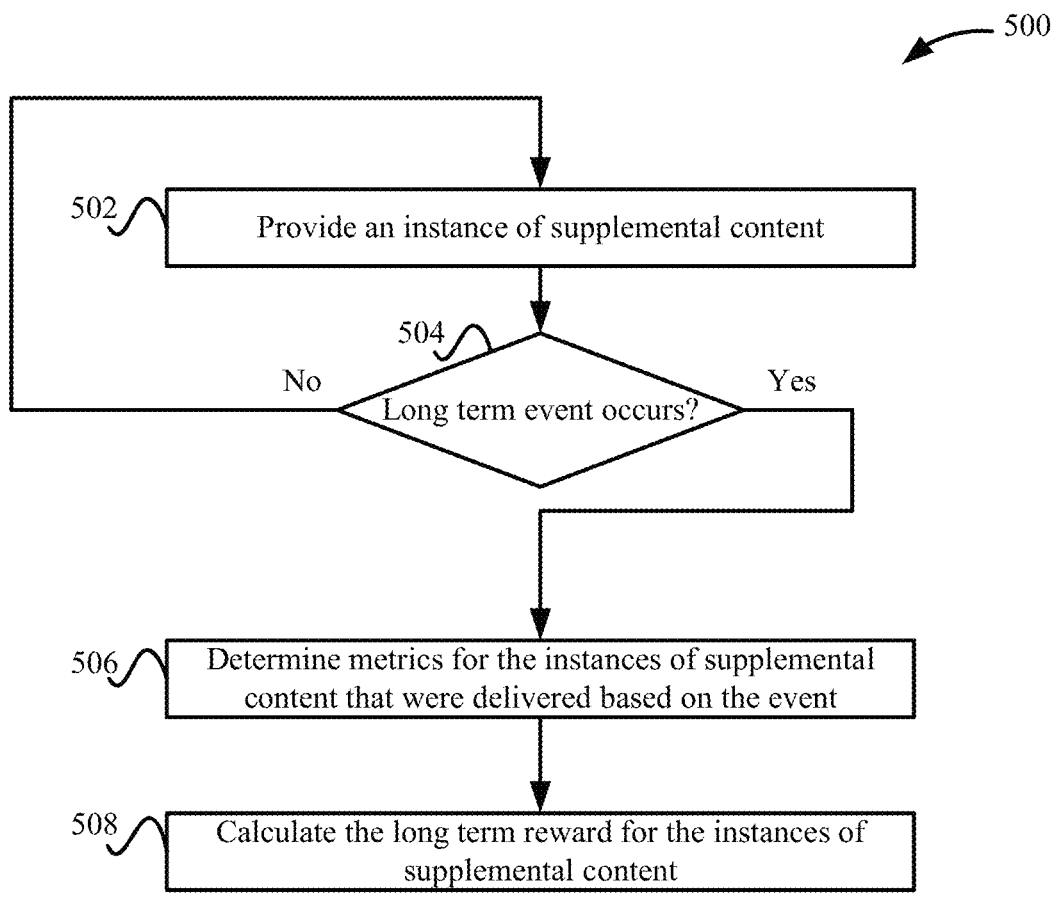
FIG. 5 depicts a simplified flowchart of a method for calculating the long-term reward metric according to some embodiments.

The long-term reward metric may be defined in different ways. FIG. 5 depicts a simplified flowchart 500 of a method for calculating the long-term reward metric according to some embodiments. Because the long-term reward metric is calculated after the impression of the instance of supplemental content ends, the long-term reward metric may be calculated after a time period. Multiple long-term reward metrics may be calculated for each instance of supplemental content that is delivered during the time period.

At 502, supplemental content agent 108 provides an instance of supplemental content. Then, at 504, supplemental content agent 108 determines if a long-term event occurs. The long-term event may be the ending of a time window, or a different event. For example, the event may be an event that occurs with the user account, such as the user account may stop watching a video or leave the site. If the long-term event does not occur, the process reiterates to 502 where another instance of supplemental content may be provided at certain times. In some respects, the long-term event may also occur without the providing of another instance of supplemental content. For example, after the time period ends, supplemental content agent 108 determines that the long-term event occurs.

At 506, when the long-term event occurs, supplemental content agent 108 determines metrics for the instances of supplement content that were delivered based on the event. The metrics may include the number of instances and the time associated with the instances. At 608, supplemental content agent 108 calculates a long-term reward metric for the instances of supplemental content.

There may be different ways to define the long-term reward. For example, trainer 410 may try to maximize the watch minutes. A time $t_0$ is defined as the time when a user account starts watching a video. Assume the user account leaves video delivery system 106 after watching 10 instances of supplemental content, the time for $i^{th}$ is $t_i$, and a first method defines the reward as:

$$r_i = t_i - t_{i-1}.$$

The above defines the long-term reward as the reward for a current instance of supplemental content minus the reward for the prior instance of supplemental content.

In a second method, assume the user account leaves video delivery system 106 after watching 10 instances of supplemental content, the time for instance j is $t_j$, then the second method defines the reward as:

$$r_i = 0, \text{ if } t < 10$$

$$r_i = t_{10} - t_6, \text{ if } t = 10.$$

In the above, reward calculator 406 models the reward at each step in which a decision is made for a long-term reward metric may be defined as a first value (e.g., 0) when a user account keeps watching after an impression and a second value (e.g., −1) for a user account that leaves a watch session after the impression.

CONCLUSION

Accordingly, supplemental content agent 108 may use short-term reward metrics and long-term reward metrics to determine instances of supplemental content to deliver for an impression. By optimizing both short-term reward metrics and long-term reward metrics, supplemental content agent 108 may optimize user relevance in addition to optimizing a metric for a longer-term reward for the main content provider. More relevant instances of supplemental content may be diverted to user accounts in addition to optimizing the long-term reward metric, such as user watch minutes.

Example Embodiments

In some embodiments, a method comprising: receiving, by a computing device, a request for supplemental content to be provided in association with main content; selecting, by the computing device, an instance of supplemental content based on a long-term reward metric and a short-term reward metric, wherein the long-term reward metric is based on feedback from delivery of a plurality of instances of supplemental content and a delivery status for a delivery constraint of one instance of supplemental content, and wherein the short-term reward metric is based on feedback from delivery of the one instance of supplemental content; and providing, by the computing device, the instance of supplemental content to a client device.

In some embodiments, the method further comprising: receiving a state that is associated characteristics of an account that is using the client device, wherein the state is used to select the instance of supplemental content.

In some embodiments, the method further comprising: receiving a state that is associated the delivery status of instances of supplemental content that are eligible to be delivered for the request, wherein the state is used to select the instance of supplemental content.

In some embodiments, the method further comprising: receiving a first state that is associated characteristics of an account that is using the client device; receiving a second state that is associated the delivery status of instances of supplemental content that are eligible to be delivered for the request; and combining the first state and the second state into a third state that is used to select the instance of supplemental content.

In some embodiments, selecting the instance of supplemental content comprises: outputting information that rates instances of supplemental content that are eligible to be delivered for the request, wherein the information is used to select the instance of supplemental content.

In some embodiments, the information comprises an allocation plan that rates the instances of supplemental content for selection.

In some embodiments, the information comprises relevance weights that are based on a relevance to an account associated with the client device.

In some embodiments, selecting the instance of supplemental content comprises: generating selection weights from the allocation plan and the relevance weights; and selecting the instance of supplemental content based on the selection weights for eligible instances of supplemental content.

In some embodiments, the short-term reward and the long-term reward are based on feedback from an account that is using the client device during a session associated with viewing the main content.

In some embodiments, the method further comprising: training a model that is used to select the instance of supplemental content based on feedback from an account that is using the client device.

In some embodiments, training the model comprises: receiving the long-term reward metric and the delivery constraint for an instance of supplemental content, wherein the delivery constraint specifies a delivery goal of the instance of supplement content; and calculating a constrained reward metric based on the long-term reward metric and an unsatisfied delivery constraint based on the delivery status, wherein the constrained reward is used to train the model.

In some embodiments, training the model comprises: calculating a general reward metric to use to train the model based on the long-term reward metric and the constrained reward metric.

In some embodiments, the long-term reward metric assigns a value to the instance of supplemental content that is measured over the plurality of instances of supplemental content.

In some embodiments, the long-term reward metric assigns a value to the instance of supplemental content based on a time that a user account continued to view the main content after the delivery of the instance of supplemental content.

In some embodiments, the short-term reward metric assigns a value to the instance of supplemental content based on interaction with the instance of supplemental content while being displayed at the client device.

In some embodiments, a non-transitory computer-readable storage medium containing instructions, that when executed, control a computer system to be operable for: receiving a request for supplemental content to be provided in association with main content; selecting an instance of supplemental content based on a long-term reward metric and a short-term reward metric, wherein the long-term reward metric is based on feedback from delivery of a plurality of instances of supplemental content and a delivery status for a delivery constraint of one instance of supplemental content, and wherein the short-term reward metric is based on feedback from delivery of the one instance of supplemental content; and providing the instance of supplemental content to a client device.

In some embodiments, further operable for: receiving a first state that is associated characteristics of an account that is using the client device; receiving a second state that is associated the delivery status of instances of supplemental content that are eligible to be delivered for the request; and combining the first state and the second state into a third state that is used to select the instance of supplemental content.

In some embodiments, selecting the instance of supplemental content comprises: outputting information that rates instances of supplemental content that are eligible to be delivered for the request, wherein the information is used to select the instance of supplemental content.

In some embodiments, further operable for: training a model that is used to select the instance of supplemental content based on feedback from a user account that is using the client device.

In some embodiments, an apparatus comprising: one or more computer processors; and a non-transitory computer-readable storage medium comprising instructions, that when executed, control the one or more computer processors to be operable for: receiving a request for supplemental content to be provided in association with main content; selecting an instance of supplemental content based on a long-term reward metric and a short-term reward metric, wherein the long-term reward metric is based on feedback from delivery of a plurality of instances of supplemental content and a delivery status for a delivery constraint of one instance of supplemental content, and wherein the short-term reward metric is based on feedback from delivery of the one instance of supplemental content; and providing the instance of supplemental content to a client device.

System

Figure 6:
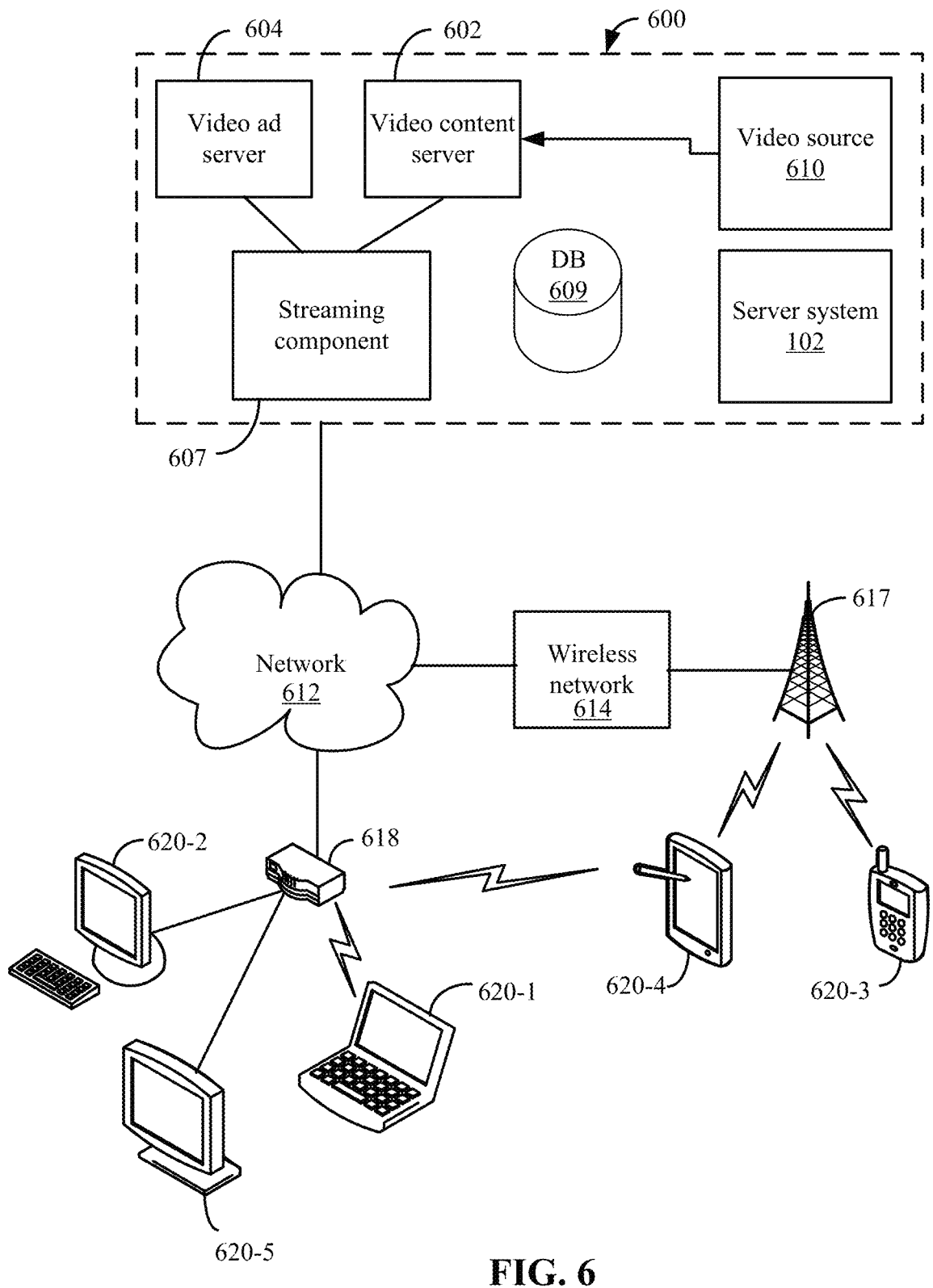
FIG. 6 depicts a video streaming system in communication with multiple client devices via one or more communication networks according to one embodiment.

Features and aspects as disclosed herein may be implemented in conjunction with a video streaming system 600 in communication with multiple client devices via one or more communication networks as shown in FIG. 6. Aspects of the video streaming system 600 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 600, video data may be obtained from one or more sources for example, from a video source 610, for use as input to a video content server 602. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 600 may include one or more computer servers or modules 602, 604, and/or 607 distributed over one or more computers. Each server 602, 604, 607 may include, or may be operatively coupled to, one or more data stores 609, for example databases, indexes, files, or other data structures. A video content server 602 may access a data store (not shown) of various video segments. The video content server 602 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 604 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 600, a public service message, or some other information. The video advertising server 604 may serve the video advertising segments as directed by a user interface controller (not shown).

The video streaming system 600 also may include server system 102.

The video streaming system 600 may further include an integration and streaming component 607 that integrates video content and video advertising into a streaming video segment. For example, streaming component 607 may be a content server or streaming media server. A controller (not shown) may determine the selection or configuration of advertising in the streaming video based on any suitable algorithm or process. The video streaming system 600 may include other modules or units not depicted in FIG. 6, for example, administrative servers, commerce servers, network infrastructure, advertising selection engines, and so forth.

The video streaming system 600 may connect to a data communication network 612. A data communication network 612 may comprise a local area network (LAN), a wide area network (WAN), for example, the Internet, a telephone network, a wireless cellular telecommunications network (WCS) 614, or some combination of these or similar networks.

One or more client devices 620 may be in communication with the video streaming system 600, via the data communication network 612, wireless cellular telecommunications network 614, and/or another network. Such client devices may include, for example, one or more laptop computers 620-1, desktop computers 620-2, "smart" mobile phones 620-3, tablet devices 620-4, network-enabled televisions 620-5, or combinations thereof, via a router 618 for a LAN, via a base station 617 for a wireless cellular telecommunications network 614, or via some other connection. In operation, such client devices 620 may send and receive data or instructions to the system 600, in response to user input received from user input devices or other input. In response, the system 600 may serve video segments and metadata from the data store 609 responsive to selection of media programs to the client devices 620. Client devices 620 may output the video content from the streaming video segment in a media player using a display screen, projector, or other video output device, and receive user input for interacting with the video content.

Distribution of audio-video data may be implemented from streaming component 607 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 607 may communicate with client device 620 using control messages and data messages to adjust to changing network conditions as the video is played. These control messages can include commands for enabling control functions such as fast forward, fast reverse, pausing, or seeking to a particular part of the file at the client.

Since streaming component 607 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 607 may use TCP-based protocols, such as HyperText Transfer Protocol (HTTP) and Real Time Messaging Protocol (RTMP). Streaming component 607 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 7:
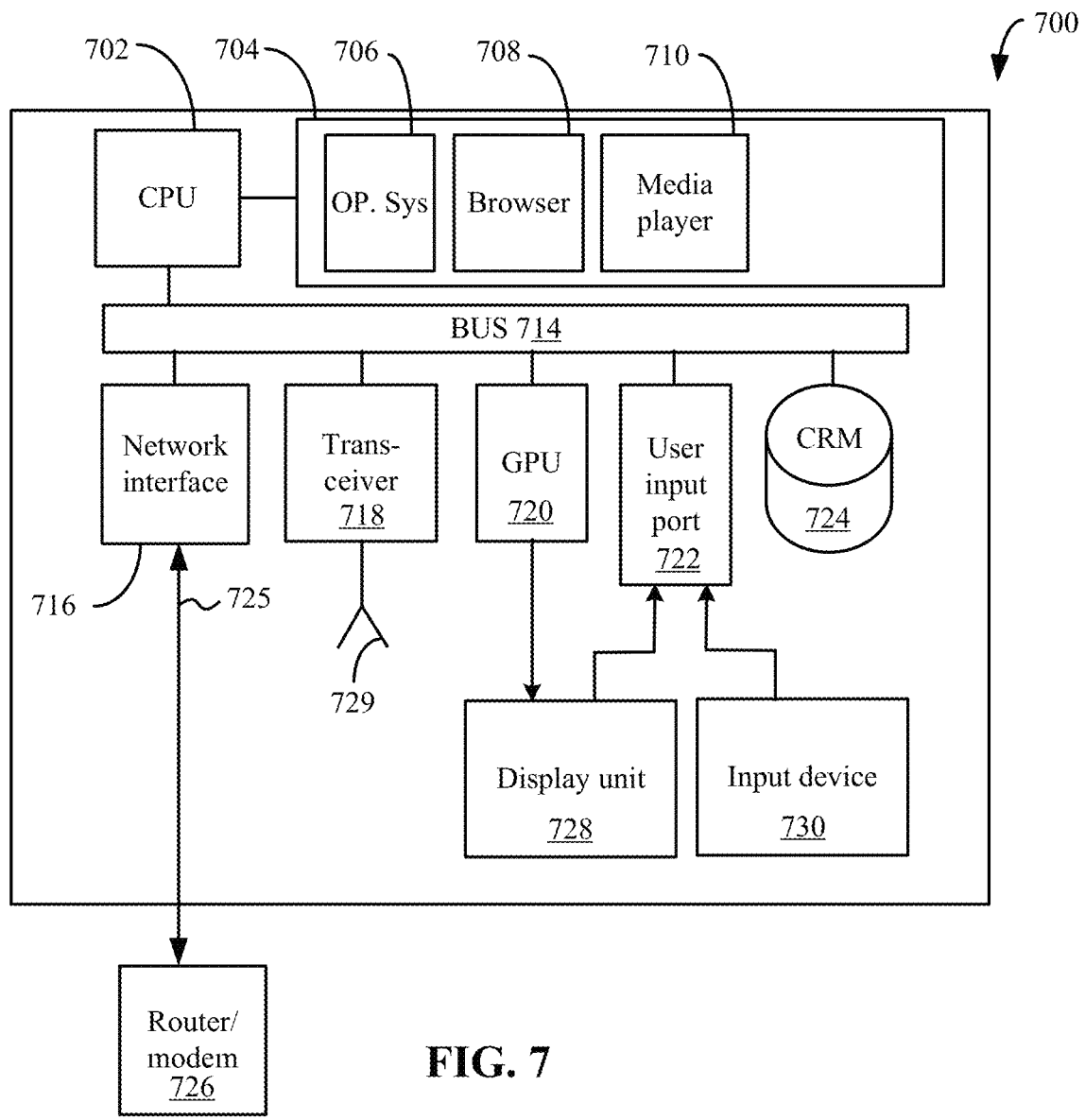
FIG. 7 depicts a diagrammatic view of an apparatus for viewing video content and advertisements.

Referring to FIG. 7, a diagrammatic view of an apparatus 700 for viewing video content and advertisements is illustrated. In selected embodiments, the apparatus 700 may include a processor (CPU) 702 operatively coupled to a processor memory 704, which holds binary-coded functional modules for execution by the processor 702. Such functional modules may include an operating system 706 for handling system functions such as input/output and memory access, a browser 708 to display web pages, and media player 710 for playing video. The memory 704 may hold additional modules not shown in FIG. 7, for example modules for performing other operations described elsewhere herein.

A bus 714 or other communication component may support communication of information within the apparatus 700. The processor 702 may be a specialized or dedicated microprocessor configured or operable to perform particular tasks in accordance with the features and aspects disclosed herein by executing machine-readable software code defining the particular tasks. Processor memory 704 (e.g., random access memory (RAM) or other dynamic storage device) may be connected to the bus 714 or directly to the processor 702, and store information and instructions to be executed by a processor 702. The memory 704 may also store temporary variables or other intermediate information during execution of such instructions.

A computer-readable medium in a storage device 724 may be connected to the bus 714 and store static information and instructions for the processor 702; for example, the storage device (CRM) 724 may store the modules 706, 708, 710 and 712 when the apparatus 700 is powered off, from which the modules may be loaded into the processor memory 704 when the apparatus 700 is powered up. The storage device 724 may include a non-transitory computer-readable storage medium holding information, instructions, or some combination thereof, for example instructions that when executed by the processor 702, cause the apparatus 700 to be configured or operable to perform one or more operations of a method as described herein.

A communication interface 716 may also be connected to the bus 714. The communication interface 716 may provide or support two-way data communication between the apparatus 700 and one or more external devices, e.g., the streaming system 600, optionally via a router/modem 726 and a wired or wireless connection. In the alternative, or in addition, the apparatus 700 may include a transceiver 718 connected to an antenna 729, through which the apparatus 700 may communicate wirelessly with a base station for a wireless communication system or with the router/modem 726. In the alternative, the apparatus 700 may communicate with a video streaming system 600 via a local area network, virtual private network, or other network. In another alternative, the apparatus 700 may be incorporated as a module or component of the system 600 and communicate with other components via the bus 714 or by some other modality.

The apparatus 700 may be connected (e.g., via the bus 714 and graphics processing unit 720) to a display unit 728. A display 728 may include any suitable configuration for displaying information to an operator of the apparatus 700. For example, a display 728 may include or utilize a liquid crystal display (LCD), touchscreen LCD (e.g., capacitive display), light emitting diode (LED) display, projector, or other display device to present information to a user of the apparatus 700 in a visual display.

One or more input devices 730 (e.g., an alphanumeric keyboard, microphone, keypad, remote controller, game controller, camera, or camera array) may be connected to the bus 714 via a user input port 722 to communicate information and commands to the apparatus 700. In selected embodiments, an input device 730 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 728, for example using a touch sensitive screen. A cursor control device may communicate direction information and command selections to the processor 702 and control cursor movement on the display 728. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
    determining, by a computing device, a reward metric based on feedback for an instance of supplemental content that was displayed;
    applying, by the computing device, a delivery status for a delivery constraint of the instance of content to the reward metric to generate a constrained reward metric, wherein the delivery status is based on delivery of instances of the supplemental content and the delivery constraint is based on a delivery goal;
    using, by the computing device, the constrained reward metric to train a model, wherein the model is used to select from a plurality of instances of supplemental content;
    selecting, by the computing device, one of the plurality of instances of supplemental content for delivery using the model; and
    causing, by the computing device, delivery of the one of the plurality of instances of supplemental content to a client device.

2. The method of claim 1, further comprising:
    receiving a request for content, wherein the one of the plurality of instances of supplemental content is provided for the request.

3. The method of claim 1, wherein the one of the plurality of instances of supplemental content is provided in a break from main content.

4. The method of claim 1, wherein the reward metric comprises a first reward metric, the method further comprising:
    calculating a second reward metric for the instance of supplemental content, wherein the second metric is calculated based on a display of the instance of supplemental content.

5. The method of claim 4, wherein:
    the first reward metric is calculated using feedback that is received after the display of the instance of the supplemental content.

6. The method of claim 5, further comprising:
    using the first reward metric and the second reward metric to train the model that is used to select from the plurality of instances of supplemental content.

7. The method of claim 1, further comprising:
    receiving a state that is associated characteristics of an account that is using the client device that sent a request for supplemental content, wherein the state is used to select the one of the plurality of instances of supplemental content using the model.

8. The method of claim 1, further comprising:
    receiving a state that is associated the delivery status of instances of supplemental content that are eligible to be delivered for a request for supplemental content, wherein the state is used to select the one of the plurality of instances of supplemental content using the model.

9. The method of claim 1, wherein applying the delivery status for the delivery constraint of the instance of supplemental content to the reward metric to generate the constrained reward metric comprises:
    penalizing the reward metric when the delivery status does not meet the delivery constraint.

10. The method of claim 1, wherein applying the delivery status for the delivery constraint of the instance of supplemental content to the reward metric to generate the constrained reward metric comprises:
    not penalizing the reward metric when the delivery status meets the delivery constraint.

11. The method of claim 1, wherein applying the delivery status for the delivery constraint of the instance of supplemental content to the reward metric to generate the constrained reward metric comprises:

adjusting a value of a parameter that is based on the delivery status, wherein the value of the parameter is used to determine the constrained reward metric.

12. The method of claim 1, wherein the reward metric comprises a first reward metric, and wherein training the model comprises:
calculating a general reward metric to use to train the model based on the constrained reward metric and a second reward metric, wherein the first reward metric is calculated using feedback that is received after a display of the instance of the supplemental content and the second reward metric is calculated using feedback that is received during the display of the instance of the supplemental content.

13. The method of claim 1, wherein the reward metric is assigned a value that is measured over delivery of multiple instances of supplemental content.

14. The method of claim 1, wherein the reward metric is assigned a value based on a time that a user account continued to view main content after the delivery of the one of the plurality of instances of supplemental content, the one of the plurality of instances of supplemental content is played during a break of the main content.

15. The method of claim 1, wherein selecting the one of the plurality of instances of supplemental content comprises:
outputting, using the model, information that rates instances of supplemental content that are eligible to be delivered for a request, wherein the information is used to select the one of the plurality of instances of supplemental content.

16. The method of claim 15, wherein the information comprises an allocation plan that rates the instances of supplemental content for selection.

17. The method of claim 16, wherein the information comprises relevance weights that are based on a relevance to an account associated with the client device that requested supplemental content.

18. A non-transitory computer-readable storage medium containing instructions, that when executed, control a computer system to be operable for:
determining a reward metric based on feedback for an instance of supplemental content that was displayed;
applying a delivery status for a delivery constraint of the instance of content to the reward metric to generate a constrained reward metric, wherein the delivery status is based on delivery of instances of the supplemental content and the delivery constraint is based on a delivery goal;
using the constrained reward metric to train a model, wherein the model is used to select from a plurality of instances of supplemental content;
selecting one of the plurality of instances of supplemental content for delivery using the model; and
causing delivery of the one of the plurality of instances of supplemental content to a client device.

19. A method comprising:
calculating, by a computing device, a first reward metric for an instance of supplemental content, wherein the first reward metric is calculated using first feedback that is based on a display of the instance of supplemental content;
calculating, by the computing device, a second reward metric for the instance of supplemental content, wherein the second reward metric is calculated using second feedback that is received after the display of the instance of the supplemental content and a delivery status for a delivery constraint of the instance of supplemental content, wherein the delivery status is based on delivery of instances of the supplemental content and the delivery constraint is based on a delivery goal;
training, by the computing device, a model using the first reward metric and the second reward metric;
selecting, by the computing device, from a plurality of instances of supplemental content to select a selected instance of supplemental content using the model; and
causing, by the computing device, delivery of the selected instance of supplemental content.

20. The method of claim 19, further comprising:
receiving a request for supplemental content, wherein the selected instance of supplemental content is provided for the request.

* * * * *